United States Patent
Manula et al.

(10) Patent No.: US 9,244,829 B2
(45) Date of Patent: Jan. 26, 2016

(54) METHOD AND SYSTEM FOR EFFICIENT MEMORY REGION DEALLOCATION

(71) Applicant: Oracle International Corporation, Redwood Shores, CA (US)

(72) Inventors: Brian Edward Manula, Oslo (NO); Haakon Ording Bugge, Oslo (NO); Robert W. Wittosch, Duluth, GA (US)

(73) Assignee: Oracle International Corporation, Redwood Shores, CA (US)

( * ) Notice: Subject to any disclaimer, the term of this patent is extended or adjusted under 35 U.S.C. 154(b) by 329 days.

(21) Appl. No.: 13/721,875

(22) Filed: Dec. 20, 2012

(65) Prior Publication Data

US 2014/0181454 A1  Jun. 26, 2014

(51) Int. Cl.
*G06F 13/00* (2006.01)
*G06F 12/02* (2006.01)
*G06F 12/10* (2006.01)
*G06F 12/14* (2006.01)
*G06F 13/28* (2006.01)

(52) U.S. Cl.
CPC ........ *G06F 12/0223* (2013.01); *G06F 12/1027* (2013.01); *G06F 12/1475* (2013.01); *G06F 12/1081* (2013.01); *G06F 13/28* (2013.01); *G06F 2212/683* (2013.01)

(58) Field of Classification Search
CPC ............................... G06F 12/023; G06F 13/28

USPC .................................................. 711/206, 207
See application file for complete search history.

(56) References Cited

U.S. PATENT DOCUMENTS

| 4,272,819 | A | * | 6/1981 | Katsumata et al. | ............. 710/22 |
| 5,301,287 | A | * | 4/1994 | Herrell et al. | ................. 711/202 |
| 2003/0135685 | A1 | * | 7/2003 | Cowan | .......................... 710/308 |
| 2007/0162641 | A1 | * | 7/2007 | Oztaskin et al. | ............. 710/22 |
| 2008/0056287 | A1 | * | 3/2008 | Kagan et al. | ................. 370/401 |
| 2008/0155168 | A1 | * | 6/2008 | Sheu et al. | ........................ 711/6 |
| 2011/0161620 | A1 | * | 6/2011 | Kaminski et al. | ............. 711/207 |

* cited by examiner

*Primary Examiner* — Aimee Li
*Assistant Examiner* — Trang Ta
(74) *Attorney, Agent, or Firm* — Osha Liang LLP

(57) ABSTRACT

A method for deallocation of a memory region involving transmitting, by a host channel adapter (HCA), a first invalidation command for invalidating at least one key associated with the memory region, transmitting, by the HCA, a second invalidation command for invalidating a translation lookaside buffer (TLB) entry for the memory region, invalidate the at least one key associated with the memory region, determining whether all memory access requests to the memory region have been processed by the HCA, stalling processing of the second invalidation command when outstanding memory access requests to the memory region are present, and processing the outstanding memory access requests for the memory region by the HCA before executing the second invalidation command invalidating the TLB entry for the memory region.

20 Claims, 4 Drawing Sheets

METHOD AND SYSTEM FOR EFFICIENT MEMORY REGION DEALLOCATION

BACKGROUND

The Infiniband® network includes nodes that communicate through a channel-based switched fabric (Infiniband® is a registered trademark of Infiniband Trade Association, located in Beaverton, Oreg.). For example, the nodes may be a host, an input/output subsystem, or a router which connects to another network. The switched fabric is made of a collection of switches, routers, and/or links that connect a set of channel adapters. The channel adapters form an interface between the switched fabric and the nodes. The channel adapter of the host is referred to as a host channel adapter. The channel adapter of an I/O subsystem is referred to as a target channel adapter.

In Infiniband®, two processes communicate using a queue pair (QP). A queue pair includes a send queue and a receive queue. Specifically, in order for a process to send a message to another process, the process posts the message to the send queue located on the host. The host may be a virtualized host including a plurality of virtual machines. The host channel adapter sends the message in the form of packets to the channel adapter having the receive queue. Each packet that is sent may include a packet sequence number. Logic associated with the receive queue ensures that packets are processed in a particular order using the packet sequence number.

In the Infiniband® network, mechanisms for allocation and dellocation of memory regions for a virtualized host are typically provided by software. Because memory address translations from virtual to physical memory are often cached on the channel adapters, deallocation of a host memory region conventionally involves flushing the cache. The region of memory being deallocated is typically unavailable for reuse until after the deallocation process has completed.

SUMMARY

In general, in one aspect, the invention relates to a method for deallocation of a memory region, comprising transmitting, by a host channel adapter (HCA), a first invalidation command for invalidating at least one key associated with the memory region, transmitting, by the HCA, a second invalidation command for invalidating a translation lookaside buffer (TLB) entry for the memory region, invalidating the at least one key associated with the memory region, determining whether all memory access requests to the memory region have been processed by the HCA, stalling processing of the second invalidation command when outstanding memory access requests to the memory region are present, and processing the outstanding memory access requests for the memory region by the HCA before executing the second invalidation command invalidating the TLB entry for the memory region.

In general, in one aspect, the invention relates to a system comprising a host executing a software application, wherein the software application is configured to issue a first invalidation command and a second invalidation command to deallocate a memory region in the host, wherein the first invalidation command is for invalidating at least one key for access to the memory region, and the second invalidation command is for invalidating a translation lookaside buffer (TLB) entry for the memory region, and a host communication adapter (HCA) operatively connected to the host. The HCA is configured to receive the first and second invalidation commands, invalidate the at least one key associated with the memory region, determine whether all memory access requests to the memory region have been processed by the HCA, stall processing of the second invalidation command, when outstanding memory access requests to the memory region are present, and process the outstanding memory access requests for the memory region before executing the second invalidation command invalidating the TLB entry for the memory region.

In general, in one aspect, the invention relates to a host channel adapter (HCA) comprising a direct memory access (DMA) validation module for storing a DMA validation table and a plurality of memory access keys, each of which is a credential to authenticate a memory access request. The DMA validation module is configured to authenticate the memory access request using a corresponding key, and process a command to invalidate a memory access key by invalidating a corresponding DMA validation entry in the DMA validation table. The HCA also comprises a memory management module (MMU) for storing a translation lookaside buffer (TLB) comprising a plurality of memory address translations for a plurality of memory regions. The HCA is configured to receive and process a request to deallocate a memory region of the plurality of memory regions, wherein the request to deallocate the memory region comprises a first invalidation command for invalidating at least one key associated with the memory region and a second invalidation command for invalidating a translation lookaside buffer (TLB) entry for the memory region, invalidate at least one key associated with the memory region, determine whether all memory access requests to the memory region have completed address translation in the MMU, stall processing of the second invalidation command, when outstanding memory access requests to the memory region are present, and process the outstanding memory access requests for the memory region before executing the second invalidation command.

Other aspects of the invention will be apparent from the following description and the appended claims.

DETAILED DESCRIPTION

Figure 1:
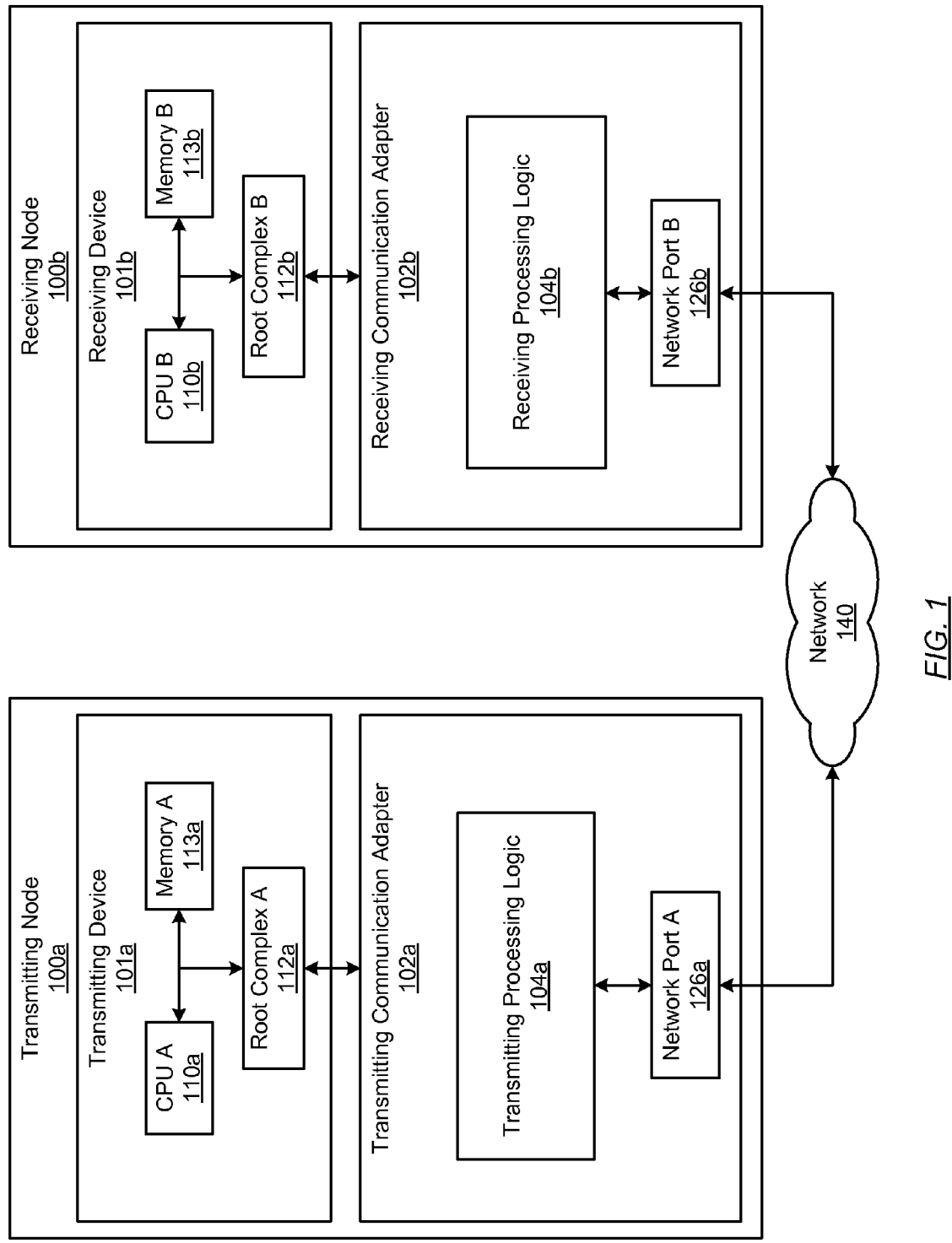
FIGS. 1-2 show schematic diagrams in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and a system for efficient memory region deallocation by a host channel adapter. More specifically, embodiments of the invention provide a combined hardware and software solution for deallocation of memory, which enforces proper ordering in hardware to ensure that all partially processed memory access requests are completed before deallocating the corresponding memory region. In one or more embodiments of the invention, the term deallocation is used to mean that no further memory accesses to the memory region are observed by the hardware (i.e., the host channel adapter (HCA)), thereby allowing software to safely deallocate the memory region.

FIG. 1 shows a schematic diagram of a communication system in one or more embodiments of the invention. In one or more embodiments of the invention, the communication system includes a transmitting node (100a) and a receiving node (100b). The transmitting node (100a) and receiving node (100b) may be any type of physical computing device connected to a network (140). The network may be any type of network, such as an Infiniband® network, a local area network, a wide area network (e.g., Internet), or any other network now known or later developed. By way of an example of the transmitting node (100a) and the receiving node (100b), the transmitting node (100a) and/or a receiving node (100b) may be a host system, a storage device, or any other type of computing system. In one or more embodiments of the invention, for a particular message, the transmitting node (100a) is a system that sends the message and the receiving node (100b) is a system that receives the message. In other words, the use of the words, "transmitting" and "receiving", refer to the roles of the respective systems for a particular message. The roles may be reversed for another message, such as a response sent from receiving node (100b) to transmitting node (100b). For such a message, the receiving node (100b) is a transmitting node and the transmitting node (100a) is a receiving node. Thus, communication may be bi-directional in one or more embodiments of the invention.

In one or more embodiments of the invention, the transmitting node (100a) and receiving node (100b) include a device (e.g., transmitting device (101a), receiving device (101b)) and a communication adapter (e.g., transmitting communication adapter (102a), receiving communication adapter (102b)). The device and the communication adapter are discussed below.

In one or more embodiments of the invention, the device (e.g., transmitting device (101a), receiving device (101b)) includes at least a minimum amount of hardware necessary to process instructions. As shown in FIG. 1, the device includes hardware, such as a central processing unit ("CPU") (e.g., CPU A (110a), CPU B (110b)), memory (e.g., memory A (113a), memory B (113b)), and a root complex (e.g., root complex A (112a), root complex B (112b)). In one or more embodiments of the invention, the CPU is a hardware processor component for processing instructions related to transmission through, or management of, the device. The CPU may include multiple hardware processors. Alternatively or additionally, each hardware processor may include multiple processing cores in one or more embodiments of the invention. In general, the CPU is any physical component configured to execute instructions for the device.

In one or more embodiments of the invention, the memory is any type of physical hardware component for storage of data. In one or more embodiments of the invention, the memory may be partitioned into separate spaces for virtual machines. In one or more embodiments, the memory further includes a payload for transmitting on the network (140) or received from the network (140) and consumed by the CPU.

Continuing with FIG. 1, in one or more embodiments of the invention, the communication adapter (e.g., transmitting communication adapter (102a), receiving communication adapter (102b)) is a physical hardware component configured to connect the corresponding device to the network (140). Specifically, the communication adapter is a hardware interface component between the corresponding device and the network. In one or more embodiments of the invention, the communication adapter is connected to the corresponding device using a peripheral component interconnect express (PCIe) connection or another connection mechanism. For example, the communication adapter may correspond to a network interface card, an Infiniband® channel adapter (e.g., target channel adapter, host channel adapter), or any other interface component for connecting the device to the network. In one or more embodiments of the invention, the communication adapter includes logic (e.g., transmitting processing logic (104a), receiving processing logic (104b)) for performing the role of the communication adapter with respect to the message. Specifically, the transmitting communication adapter (102a) includes transmitting processing logic (104a) and the receiving communication adapter (102b) includes receiving processing logic (104b) in one or more embodiments of the invention. Although not shown in FIG. 1, the transmitting communication adapter (102a) and/or receiving communication adapter (102b) may also include receiving processing logic and transmitting processing logic, respectively, without departing from the scope of the invention. The transmitting processing logic (104a) and the receiving processing logic (104b) are discussed below.

In one or more embodiments of the invention, the transmitting processing logic (104a) is hardware or firmware that includes functionality to receive the payload from the transmitting device (101a), partition the payload into packets with header information, and transmit the packets via the network port (126a) on the network (140). Further, in one or more embodiments of the invention, the transmitting processing logic (104a) includes functionality to determine whether an acknowledgement is not received for a packet or when an error message is received for a packet and retransmit the packet. By way of an example, the transmitting processing logic for an Infiniband® network is discussed in further detail in FIG. 2 below.

Continuing with FIG. 1, as discussed above, packets are sent to, and received from, a receiving node (100b). A receiving node (100b) may correspond to a second host system in the Infiniband® network. Alternatively or additionally, the receiving node (100b) may correspond to a data storage device used by the host to store and receive data.

In one or more embodiments of the invention, the receiving node includes a receiving communication adapter (102b) that includes receiving processing logic (104b). Receiving processing logic (104b) is hardware or firmware that includes functionality to receive the packets via the network (140) and the network port (126b) from the transmitting node (100a) and forward the packets to the receiving device (101b). The receiving processing logic (104b) may include functionality to receive packets for a message from the network (140). The receiving processing logic may further include functionality to transmit an acknowledgement when a packet is successfully received. In one or more embodiments of the invention, the receiving node may only transmit an acknowledgement when the communication channel, the packet, or the particular message of which the packet is a part requires an acknowledgement. For example, the communication channel may be in a reliable transmission mode or an unreliable transmission mode. In the reliable transmission mode, an acknowledgement is sent for each packet received. In the unreliable transmission mode, an acknowledgement is not received.

The receiving processing logic (104b) may further include functionality to send error message if the packet is not successfully received or cannot be processed. The error message may include an instruction to retry sending the message after a predefined period of time. The receiving processing logic (104b) may include functionality to perform similar steps described in FIG. 3 to invalidate (i.e., deallocate or render unusuable) one or more memory regions efficiently.

Alternatively, the receiving processing logic (104b) may transmit packets to the receiving device (101b) as packets are being received. By way of an example, the receiving processing logic for an Infiniband® network is discussed in further detail in FIG. 2 below.

Although not described in FIG. 1, software instructions to perform embodiments of the invention may be stored on a non-transitory computer readable medium such as a compact disc (CD), a diskette, a tape, or any other computer readable storage device. For example, the transmitting processing logic and/or the receiving processing logic may be, in whole or in part, stored as software instructions on the non-transitory computer readable medium. Alternatively or additionally, the transmitting processing logic and/or receiving processing logic may be implemented in hardware and/or firmware.

Figure 2:
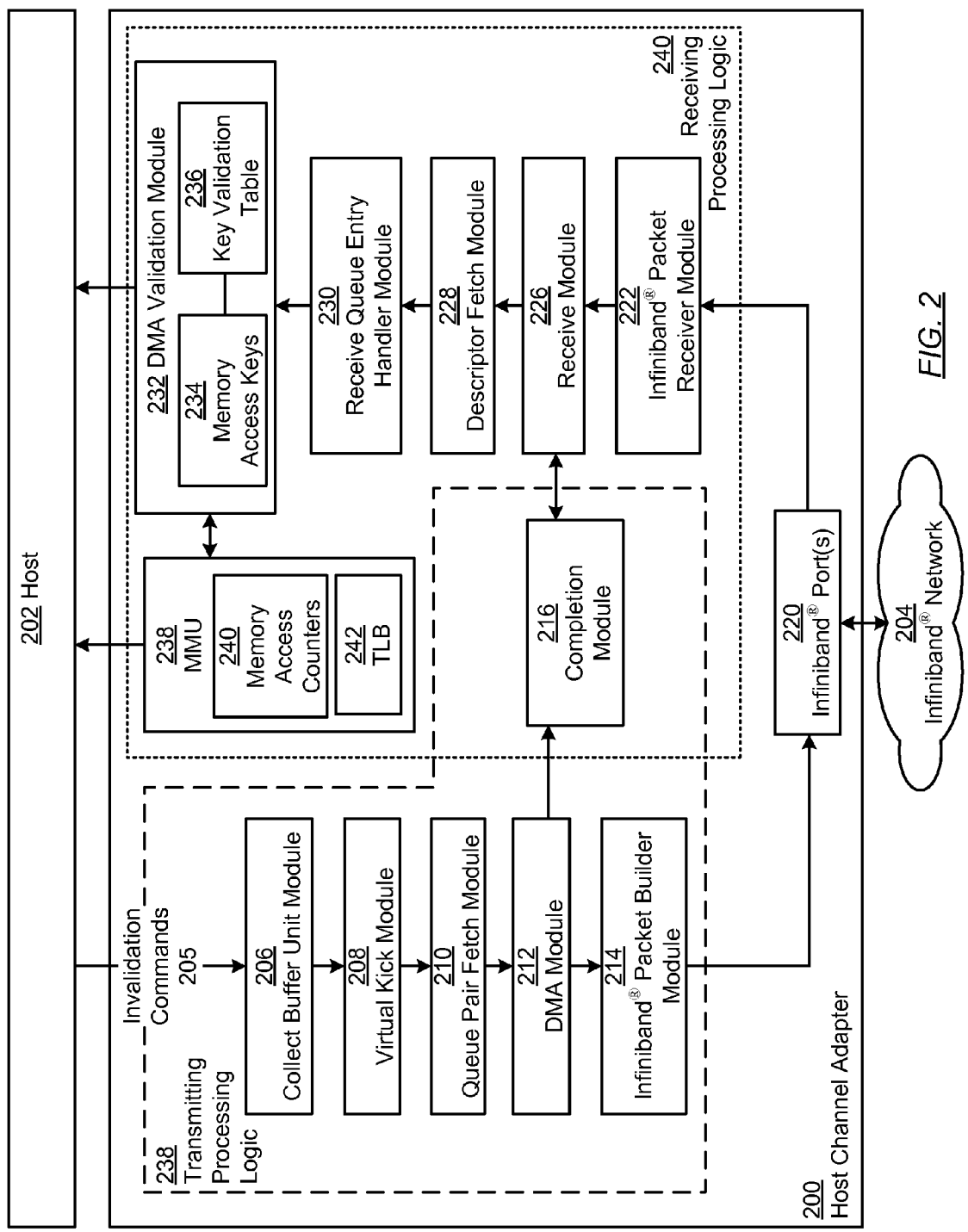

As discussed above, FIG. 1 shows a communication system for transmitting messages, receiving messages, and receiving responses to the transmitted messages. FIG. 2 shows a schematic diagram of a communication adapter when the communication adapter is a host channel adapter (200) and the network is an Infiniband® network, in one or more embodiments of the invention.

As shown in FIG. 2, the host channel adapter (200) may include a collect buffer unit module (206), a virtual kick module (208), a queue pair fetch module (210), a direct memory access (DMA) module (212), an Infiniband® packet builder module (214), one or more Infiniband® ports (220), a completion module (216), an Infiniband® packet receiver module (222), a receive module (226), a descriptor fetch module (228), a receive queue entry handler module (230), and a DMA validation module (232). In the host channel adapter of FIG. 2, the host channel adapter includes both transmitting processing logic (238) for sending messages on the Infiniband® network (204) and receiving processing logic (240) for responder messages from the Infiniband® network (204). In one or more embodiments of the invention, the collect buffer unit module (206), virtual kick module (208), queue pair fetch module (210), direct memory access (DMA) module (212), Infiniband® packet builder module (214), and completion module (216) may be components of the transmitting processing logic (238). The Infiniband® packet receiver module (222), receive module (226), descriptor fetch module (228), receive queue entry handler module (230), and DMA validation module (232) may be components of the receiving processing logic (240). As shown, the completion module (216) may be considered a component of both the transmitting processing logic (238) and the receiving processing logic (240) in one or more embodiments of the invention.

In one or more embodiments of the invention, each module may correspond to hardware and/or firmware. Each module is configured to process data units. Each data unit corresponds to a command or a received message or packet. For example, a data unit may be the command, an address of a location on the communication adapter storing the command, a portion of a message corresponding to the command, a packet, an identifier of a packet, or any other identifier corresponding to a command, a portion of a command, a message, or a portion of a message.

Referring to FIG. 2, the dark arrows between modules show the transmission path of data units between modules as part of processing commands and received messages in one or more embodiments of the invention. Data units may have other transmission paths (not shown) without departing from the invention. Further, other communication channels and/or additional components of the host channel adapter (200) may exist without departing from the invention. Each of the components of the resource pool is discussed below.

The collect buffer controller module (206) includes functionality to receive command data from the host and store the command data on the host channel adapter. Specifically, the collect buffer controller module (206) is connected to the host and configured to receive the command from the host and store the command in a buffer. When the command is received, the collect buffer controller module is configured to issue a kick that indicates that the command is received.

In one or more embodiments of the invention, the virtual kick module (208) includes functionality to load balance commands received from applications. Specifically, the virtual kick module is configured to initiate execution of commands through the remainder of the transmitting processing logic (238) in accordance with a load balancing protocol.

In one or more embodiments of the invention, the queue pair fetch module (210) includes functionality to obtain queue pair state information for the queue pair corresponding to the data unit. Specifically, per the Infiniband® protocol, the message has a corresponding send queue and a receive queue. The send queue and receive queue form a queue pair. Accordingly, the queue pair corresponding to the message is the queue pair corresponding to the data unit in one or more embodiments of the invention. The queue pair state information may include, for example, sequence number, address of remote receive queue/send queue, whether the queue pair is allowed to send or allowed to receive, and other state information.

In one or more embodiments of the invention, the DMA module (212) includes functionality to perform DMA with host memory. The DMA module may include functionality to determine whether a command in a data unit or referenced by a data unit identifies a location in host memory that includes payload. The DMA module may further include functionality to validate that the process sending the command has necessary permissions to access the location, and to obtain the payload from the host memory, and store the payload in the DMA memory. Specifically, the DMA memory corresponds to a storage unit for storing a payload obtained using DMA.

Continuing with FIG. 2, in one or more embodiments of the invention, the DMA module (212) is connected to an Infiniband® packet builder module (214). In one or more embodiments of the invention, the Infiniband® packet builder module includes functionality to generate one or more packets for each data unit and to initiate transmission of the one or more packets on the Infiniband® network (204) via the Infiniband® port(s) (220). In one or more embodiments of the invention, the Infiniband® packet builder module may include functionality to obtain the payload from a buffer corresponding to the data unit, from the host memory, and from an embedded processor subsystem memory.

In one or more embodiments of the invention, the transmitting processing logic (238) of the HCA (200) is configured to receive and process memory region invalidation commands (205). The memory region invalidation commands (205) may be issued by software executing in the host (202), requesting one or more regions of memory be deallocated. In one or more embodiments of the invention, the memory region invalidation commands (205) may be a set of two commands including (1) a command to invalidate a memory access key for the memory region to be deallocated (i.e., Invalid_Key), and (2) a command to invalidate a translation lookaside buffer (TLB) entry including the virtual-to-physical memory address translation for the memory region to be deallocated (i.e., Invalid_TLB). The memory region invalidation commands (205) are discussed further in FIGS. 2-4.

In one or more embodiments of the invention, the completion module (216) includes functionality to manage packets for queue pairs set in reliable transmission mode. Specifically, in one or more embodiments of the invention, when a queue pair is in a reliable transmission mode, then the receiving/responder channel adapter of a new packet responds to the new packet with an acknowledgement message indicating that transmission completed or an error message indicating that transmission failed. The completion module (216) includes functionality to manage data units corresponding to packets until an acknowledgement is received or transmission is deemed to have failed (e.g., by a timeout).

In one or more embodiments of the invention, the completion module (216) includes functionality to determine when an acknowledgement message is received, an error message is received, or a transmission times out. In one or more embodiments of the invention, the completion module (216) does not receive an acknowledgement message for a transmitted packet. This may occur, for example, when a packet is lost during transmission across the Infiniband® network or when the destination component has failed.

In one or more embodiments of the invention, the completion module (216) includes functionality to receive an acknowledgement message from a responder channel adapter. An acknowledgment message may indicate that a referenced packet has been received by the responder channel adapter. In one embodiment of the invention, the responder channel adapter may send an error message (i.e., a negative acknowledgement message) that indicates a referenced packet was not properly received (e.g., the received packet was corrupted). In one embodiment of the invention, the negative acknowledgement message may also contain other information. This information may include a request to stop transmitting packets, or to wait a specified period of time before resuming transmission.

In one or more embodiments of the invention, the Infiniband® packet receiver module (222) includes functionality to receive packets from the Infiniband® port(s) (220). In one or more embodiments of the invention, the Infiniband® packet receiver module (222) includes functionality to perform a checksum to verify that the packet is correct, parse the headers of the received packets, and place the payload of the packet in memory. In one or more embodiments of the invention, the Infiniband® packet receiver module (222) includes functionality to obtain the queue pair state for each packet from a queue pair state cache. In one or more embodiments of the invention, the Infiniband® packet receiver module includes functionality to transmit a data unit for each packet to the receive module (226) for further processing.

In one or more embodiments of the invention, the receive module (226) includes functionality to validate the queue pair state obtained for the packet. The receive module (226) includes functionality to determine whether the packet should be accepted for processing. In one or more embodiments of the invention, if the packet corresponds to an acknowledgement or an error message for a packet sent by the host channel adapter (200), the receive module includes functionality to update the completion module (216).

Additionally or alternatively, the receive module (226) includes a queue that includes functionality to store data units waiting for one or more reference to buffer location(s) or waiting for transmission to a next module. Specifically, when a process in a virtual machine is waiting for data associated with a queue pair, the process may create receive queue entries that reference one or more buffer locations in host memory in one or more embodiments of the invention. For each data unit in the receive module hardware linked list queue, the receive module includes functionality to identify the receive queue entries from a host channel adapter cache or from host memory, and associate the identifiers of the receive queue entries with the data unit.

In one or more embodiments of the invention, the descriptor fetch module (228) includes functionality to obtain descriptors for processing a data unit. For example, the descriptor fetch module may include functionality to obtain descriptors for a receive queue, a shared receive queue, a ring buffer, and the completion queue.

In one or more embodiments of the invention, the receive queue entry handler module (230) includes functionality to obtain the contents of the receive queue entries. In one or more embodiments of the invention, the receive queue entry handler module (230) includes functionality to identify the location of the receive queue entry corresponding to the data unit and obtain the buffer references in the receive queue entry. In one or more embodiments of the invention, the receive queue entry may be located on a cache of the host channel adapter (200) or in host memory.

In one or more embodiments of the invention, the DMA validation module (232) includes functionality to perform DMA validation and initiate DMA between the host channel adapter and the host memory. The DMA validation module includes functionality to confirm that the remote process that sent the packet has permission to write to the buffer(s) referenced by the buffer references, and confirm that the address and the size of the buffer(s) match the address and size of the memory region referenced in the packet. Further, in one or more embodiments of the invention, the DMA validation module (232) includes functionality to initiate DMA with host memory when the DMA is validated.

In one or more embodiments of the invention, the DMA validation module (232) is configured to store a cache of memory access keys (234) and a corresponding key validation table (236). For each region of host memory, a memory access key exists which acts as a credential to access the corresponding memory region. When access to a memory region is requested by a process or software application (e.g., for a memory read or write operation), a valid key accompanies the request as a credential that is used to authenticate the memory access request. More specifically, in one or more embodiments of the invention, when a local HCA is reading memory, the local HCA provides a memory access key that is a local key, or an L_key as a credential to authenticate the memory access request. When a remote node is performing an RDMA operation (read, write, or atomic), the remote node provides a memory access key that is a remote key, or R_key.

In one or more embodiments of the invention, DMA validation module (232) is also configured to validate L_key(s) and R_key(s) before corresponding memory accesses are authenticated. Specifically, each memory access key (234) must be validated using the information stored in the key validation table (236) before memory access using the key is permitted. Accordingly, the key validation table (236) stores DMA validation entries against which memory access keys (234) are validated. In one or more embodiments, the memory access keys (234) are indexes into the key validation table (236). Each DMA validation entry stored in the DMA validation table includes a base memory address indicating where the memory region to which access is requested begins, a size of the memory region indicating how large the memory region is, and two sets of permission data. The first set of permission data corresponds to local accesses, and may indicate whether a local HCA has permission to read, write, or read and write to the memory region. Similarly, the second set of permission data corresponds to remote accesses, and may indicate whether a remote node has permission to read, write, or read and write to the memory region. Those skilled in the art will appreciate that the memory addresses stored in the DMA validation entries may be virtual addresses corresponding to a virtualized host system.

The memory management unit, or MMU (241), manages address translations from virtual memory addresses to physical memory addresses. The virtual-to-physical address mappings are stored in a translation lookaside buffer, or TLB (242). The TLB (242) is essentially cache storage on the HCA (200) which stores the most recent virtual-to-physical address translations. In one or more embodiments of the invention, the MMU (241) in the HCA (200) also includes one or more memory access counters (244). In one or more embodiments of the invention, the memory access counters (244) track the number of memory accesses to a particular region of memory. A distinct memory access counter (244) may exist for each DMA validation entry in the key validation table. In this manner, memory access counters (244) keep a count of the number of memory access requests that have been issued, and the number of memory access requests that remain outstanding when a particular region of memory is to be deallocated. In one or more embodiments of the invention, the memory access counters (244) are used to ensure proper ordering, in hardware, of invalidation commands (205).

In one or more embodiments of the invention, the memory access counter(s) (244) may be incremented each time a memory access request for a memory region is processed by the DMA validation module (232). More specifically, memory access counters (244) are incremented after the memory access request has been validated by the DMA validation module (232). That is, the memory access counter for a memory region may be incremented when the key for access to the memory region is validated by the DMA validation module (232). The memory access counter(s) (244) may be correspondingly decremented when the memory access request has entered the ordered domain between the HCA and main memory (i.e., entered the PCIe bus between the HCA and host memory). This is after the memory access request has completed its virtual-to-physical address translation in TLB (242). Alternatives may exist to when the counters are incremented/decremented without departing from the scope of the invention. For example, in one or more embodiments of the invention, the memory counter for a memory access request may be incremented when the memory access request is issued by software or received for processing by the transmitting processing logic of the HCA (200).

In one or more embodiments of the invention, to deallocate a memory region, two distinct entries are invalidated, namely the memory region as stored in the DMA Validation Module (232) and the address translation entry for the memory region that is cached in the TLB (242). In one or more embodiments, invalidation of these two entries may be accomplished in one of several ways. For example, a combined work request which includes commands to invalidate both entries in a single work request may be issued by software in the host to the HCA which processes the combined work request. A work request is a request from the host to the HCA for the HCA to perform one or more operations. As such, a work request may include one or more commands for performing an action. In one or more embodiments of the invention, a work request is processed via the transmitting processing logic and the receiving processing logic of one or more HCAs.

Alternatively, two separate work requests may be issued by software to the HCA, where the first work request includes a command to invalidate the DMA validation entry in the key validation table (236), and the latter work request includes a command to invalidate the address translation entry stored in the TLB (242). In this second scenario, the latter work request is automatically timed by hardware to ensure proper ordering, i.e., that the TLB address translation entry is invalidated only after all outstanding memory access requests as tracked by one or more memory access counters (244) have been processed. In yet another embodiment of the invention, two work requests may be issued by software to the HCA for memory deallocation, where software monitors the timing and enforces the proper order between the two work requests by not issuing the latter work request until the DMA validation entry work request has completed processing by the HCA.

Figure 3:
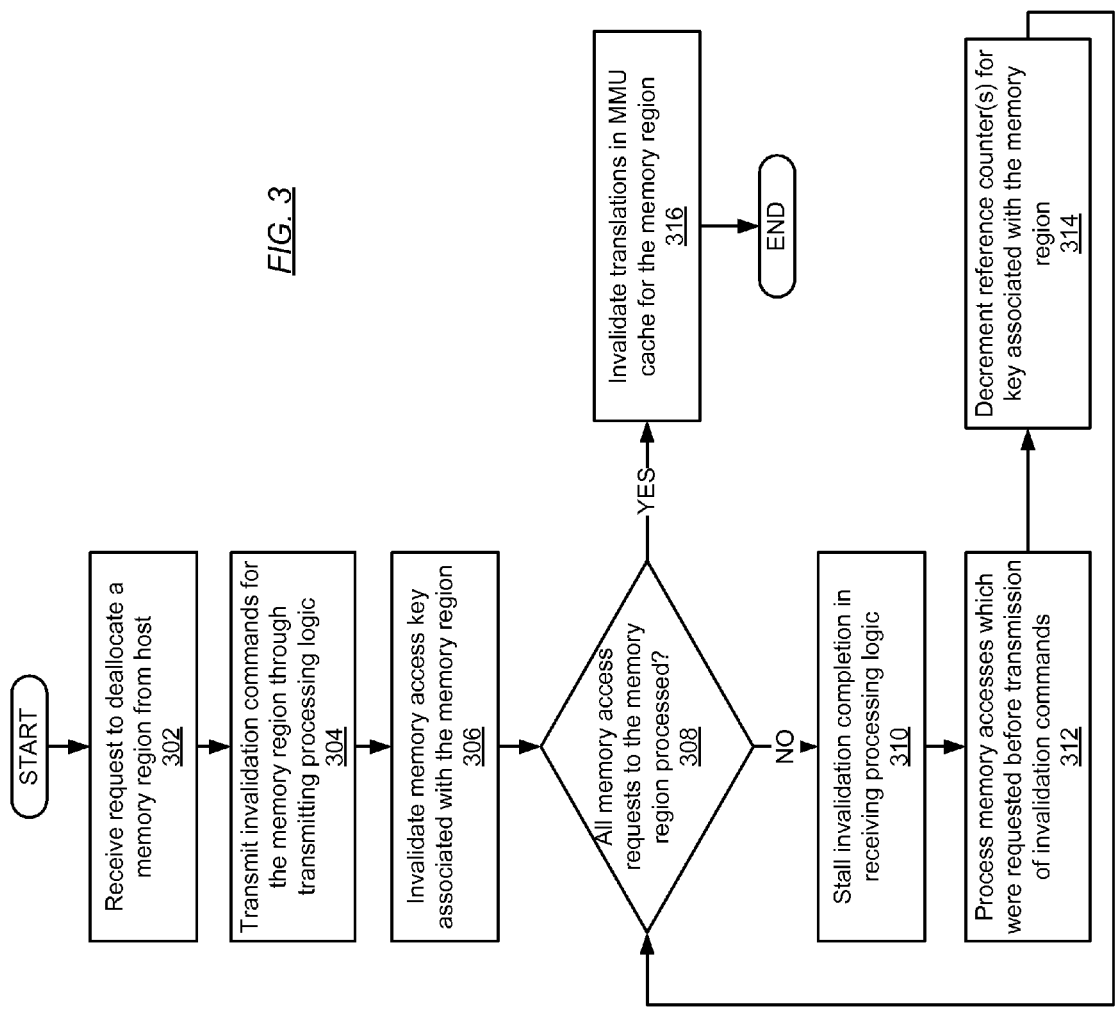
FIG. 3 shows a flowchart in accordance with one or more embodiments of the invention.

FIG. 3 shows a flowchart for a method of memory region deallocation in accordance with one or more embodiments of the invention. While the various steps in the flowchart are presented and described sequentially, some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, additional steps, omitted in FIG. 3, may be included in performing this method. Accordingly, the specific arrangement of steps shown in FIG. 3 should not be construed as limiting the scope of the invention.

In ST 302, a request to deallocate a memory region is received, by the HCA, from software executing on the host. In one or more embodiments of the invention, the deallocation request may be issued by the software as a combined work request or two separate work requests which require hardware or software fencing. Upon receiving the work request for memory region deallocation, the HCA transmits the invalidation commands for the memory region through the transmitting processing logic (ST 304). Invalidation commands may include, in one or more embodiments of the invention, an Invalid_Key and an Invalid_TLB command. In one or more embodiments of the invention, the Invalid_Key command identifies the key that is used as a credential for access to the memory region. The Invalid_TLB command identifies the TLB entry which stores the memory address translation of the corresponding memory region to be deallocated. The invalidation commands are processed through the transmitting processing logic and the receiving processing logic until they are received in the DMA validation module of the receive pipeline. At the DMA validation module, one or more keys associated with the memory region are invalidated (ST 306). More specifically, local and/or remote keys associated with the memory region may be invalidated by removing the corresponding DMA validation entries for the memory region from the key validation table.

Those skilled in the art will appreciate that key invalidation in ST 306 may occur instantaneously and does not depend on any other operations completing first. However, in one or more embodiments of the invention, the completion of the work request for key invalidation is not written by the completion module until all memory access requests which have passed into the DMA validation module have completed their corresponding virtual-to-physical address translation in the TLB, and the memory access requests have entered the PCIe ordered domain en route to the host system. A completion of the work request is a write performed by the HCA into a specific queue in host memory indicating that the operation was performed successfully to the software.

Accordingly, ST 308 requires a determination to be made as to whether all outstanding memory access requests to the memory region have been processed. In one or more embodiments of the invention, ST 308 may be performed by determining whether the memory access counter associated with the memory region is zero. Alternatively, there may exist other methods for determining whether all memory access requests have been processed. For example, the bus/interconnect between the HCA and memory (e.g., PCIe interconnect), may employ an ordering mechanism ensuring that prior issued requests have been executed.

When all memory access requests have been processed, then the process proceeds to invalidate the cached MMU address translations stored in the TLB (ST 316), and the process ends. Alternatively, the process proceeds to ST 310, where key invalidation completion is stalled until all memory access requests to the memory region have completed address translation. In one or more embodiments of the invention, the stalling of key invalidation completion is performed by the hardware, in the receiving processing logic of the HCA. In alternate embodiments, when software issues a memory deallocation request in the form of two separate work requests, software may stall the transmission of the second work request until a completion of the key invalidation work request is written to the host by the completion module.

In ST 312, memory accesses which were requested and processed by the DMA validation module before transmission of the Invalid key command is processed by the HCA, so that address translation for the outstanding memory access requests is completed. Correspondingly, memory access counter(s) are decremented when address translation completes for each memory access request and the access requests have moved to the PCIe ordered domain (ST 314). When the memory access counter(s) are zero, all memory access requests are processed (ST 308), at which point the address translations in the TLB for the memory region are invalidated and the process ends. Memory access requests received for the memory region after the invalidation process completes are blocked or dropped, because such memory access requests are not authenticated using a valid key.

Figure 4:
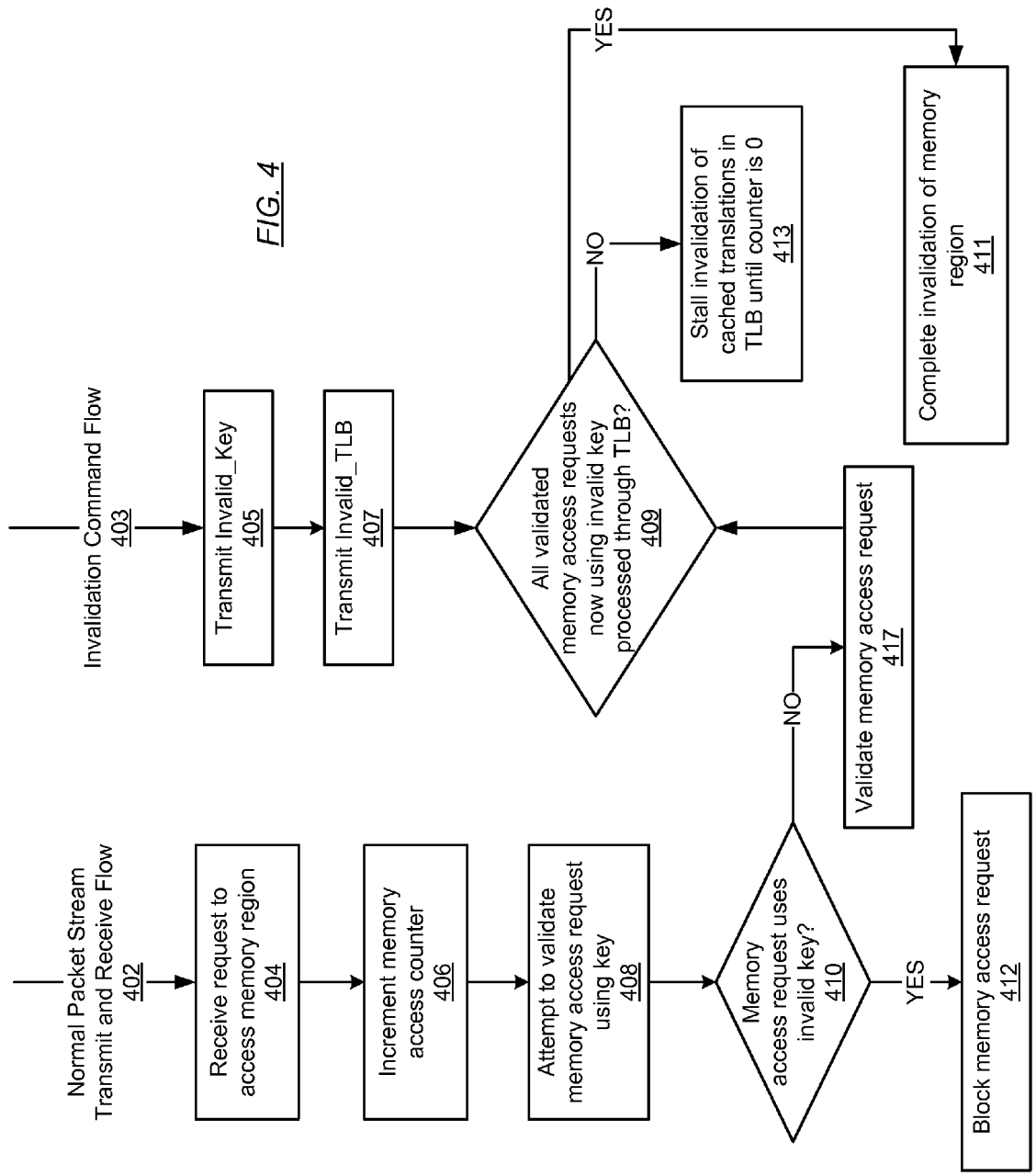
FIG. 4 shows a flow diagram in accordance with one or more embodiments of the invention.

FIG. 4 shows a flow chart example for memory region deallocation in accordance with one or more embodiments of the invention. One or more of the steps shown in FIG. 4 may be omitted, repeated, and/or performed in a different order than that shown in FIG. 4. Accordingly, the specific arrangement of steps shown in FIG. 4 should not be construed as limiting the scope of the invention. The following example is provided for exemplary purposes only and accordingly should not be construed as limiting the invention.

FIG. 4 shows two parallel flow diagrams that may, in one or more embodiments, occur simultaneously. Those of ordinary skill in the art will appreciate that a request to deallocate a memory region may be issued while normal packet stream operations are ongoing. Accordingly, FIG. 4 captures the example scenario which illustrates such an overlap between normal packet stream transmit/receive (402) and memory region deallocation (403). More specifically, the left handside of the flow diagram describes steps involved in normal packet stream transmit and receive (402) between HCAs of different nodes or between local HCAs. The right-hand side of the flow diagram describes steps involved in deallocation of a memory region, or more specifically, in the invalidation command flow (403).

In Step 404, a request to access a particular memory region is received in the normal packet flow. The request to access a particular memory region may be in the form of an RDMA write operation, an RDMA read operation, a send operation, or an atomic operation. In one or more embodiments of the invention, the request is also accompanied by an appropriate key, depending on whether the request is a remote request or a local request. When such a request is received, the memory access counter may be incremented (ST 406). The memory access counter tracks how many requests to access each memory region are outstanding at a given point in time. Before the memory access to the memory region is permitted, the key is validated using the DMA validation entries stored in the key validation table in the HCA (ST 408). When the key is validated, indicating the request is authenticated, the validated memory access request is translated and the memory access is permitted and the operation is performed (ST 417).

However, when the key used to access the memory region cannot be validated, this may indicate, in one or more embodiments, that the memory region is invalid or that at least one of the invalidation commands for the deallocation of the memory region have been processed. In this case, access to the memory region is blocked (ST 412), and the flow ends.

Upon determining that the memory access request is authenticated with a valid key, the process flow moves to ST 409. This is where the normal packet flow and the invalidation flow may intersect, because although a key is determined to be valid, the memory region deallocation process may also be underway simultaneously, and a determination must be made as to how much of the invalidation process has been completed. Accordingly, a determination is made as to whether all validated memory access requests which now use an invalid key have been processed through the MMU, where their addresses have been translated via the TLB (ST 409). In other words, memory access requests that were processed through the DMA validation module with a valid key may subsequently be associated with an invalid key, because on the invalidation flow side, an Invalid_Key command may have been issued from software in the host. The Invalid_Key command is transmitted through the transmitting processing logic of the HCA, and to the DMA validation module of the receiving processing logic of the HCA (ST 405). As described above, the Invalid_Key command invalidates the DMA validation entry corresponding to the remote and/or local keys for the particular memory region to be deallocated. The DMA validation entry for the memory region may be invalidated, in one or more embodiments of the invention, instantaneously after the Invalid_Key command is issued. This is how a memory access requests may be processed through the DMA validation module with a valid key, which may thereafter become an invalid key before the memory access requests is fully processed through the MMU.

Next, the Invalid_TLB command is transmitted through the HCA pipelines in a similar manner (ST 407). The Invalid_TLB command is received by the MMU in the receiving processing logic of the HCA. As described above, the two commands may be transmitted together in a single work request; however, either software or hardware performs appropriate fencing to ensure that the commands are always processed in order such that the Invalid_Key command is processed before the Invalid_TLB command. Accordingly, in ST 409, a determination is made as to whether there are any outstanding memory access requests to process, before one or more TLB entries for the memory region are invalidated. This may be assessed, in one or more embodiments of the invention, by inspecting the memory access counter(s) for the memory region. If outstanding memory access requests are present that have passed the key validation stage but have not yet made to the PCIe to the host for execution, then the TLB entry invalidation is stalled until the memory access counter (s) is/are zero (ST 413). If there are no outstanding memory access requests, the Invalid_TLB command is carried out, i.e., address translation entries for the memory region are flushed from the TLB in the MMU (ST 411).

Returning to ST 409 where the two flows intersect, when a memory key is valid, a follow-up decision is made as to whether the memory access was validated before the processing of the Invalid_Key command. As such, it is possible for the Invalid_Key command to be issued after memory access requests for the memory region have been processed through the DMA validation module, but not yet through the MMU/TLB. As described above, the completion for the Invalid_Key command cannot be built by the HCA until all memory access requests have completed the virtual-to-physical address translation in the TLB and the memory accesses have entered the PCIe ordered domain. In the case where all translations for the memory region targeted for invalidation have not completed, the invalidation of the TLB entries is stalled by either hardware or software (ST 413), and the completion for the Invalid_Key command is not sent until all the memory access requests are processed through the MMU. Upon processing of all outstanding memory requests (e.g., memory access counters are zero) the TLB entries for the memory region are invalidated (ST 411).

In one or more embodiments, when a completion indication of the second invalidation command (i.e., TLB invalidation) has been observed by host software, host software may safely deallocate the region, and be ensured that no further memory accesses to the memory region from the HCA will be observed.

One or more embodiments of the invention may provide a robust solution for memory deallocation that is implemented using dedicated hardware for handling the sequencing of invalidation commands and hardware and/or software monitoring to ensure proper ordering of commands such that no outstanding memory access requests to a previously allocated memory region are ignored. One or more embodiments of the invention may also provide for less memory to be used overall, and improves on memory deallocation times.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for deallocation of a memory region, comprising:
    transmitting, by a host channel adapter (HCA), a first invalidation command for invalidating at least one key associated with the memory region, wherein the HCA is an Infiniband HCA that communicates via the Infiniband network;
    transmitting, by the HCA, a second invalidation command for invalidating a translation lookaside buffer (TLB) entry for the memory region, wherein the first and second invalidation commands are transmitted via a send queue of a queue pair (QP) associated with the Infiniband HCA;
    invalidating the at least one key associated with the memory region by removing a corresponding DMA validation entry for the memory region from a key validation table stored in the DMA module of the Infiniband HCA, wherein the at least one key is an index into the key validation table;
    determining whether all memory access requests to the memory region have been processed by the Infiniband HCA;
    stalling processing of the second invalidation command when outstanding memory access requests to the memory region are present; and
    processing the outstanding memory access requests for the memory region by the Infiniband HCA before executing the second invalidation command invalidating the TLB entry for the memory region.

2. The method of claim 1, further comprising:
    receiving, by the Infiniband HCA, a request to access the memory region, wherein the request to access the memory region comprises a key for authenticating the request to access the memory region;
    incrementing a memory access counter when the request to access the memory region is processed by the Infiniband HCA; and
    attempting to validate the key by the Infiniband HCA, wherein when the key is validated by the Infiniband HCA, ensuring that a corresponding address translation for the memory region is completed before deallocating the memory region.

3. The method of claim 2, wherein ensuring that a corresponding address translation for the memory region is completed before deallocating the memory region comprises stalling processing of the second invalidation command until the request to access the memory region completes address translation using the TLB entry for the memory region.

4. The method of claim 2, wherein when the validation of the key is unsuccessful, blocking access to the memory region.

5. The method of claim 2, further comprising:
    granting access to the memory region, when the key is validated by the Infiniband HCA.

6. The method of claim 2, wherein determining whether all memory access requests to the memory region have been processed comprises:
    inspecting the memory access counter to determine whether the memory access counter has a value greater than zero.

7. The method of claim 6, wherein when the memory access counter has a value of zero, completing processing of the second invalidation command, resulting in deallocation of the memory region.

8. The method of claim 1, wherein the first and second invalidation commands are issued as a single work request by software executing on a host system operatively connected to the Infiniband HCA.

9. The method of claim 8, wherein stalling processing of the second invalidation command is performed by the software.

10. The method of claim 1, wherein invaliding the at least one key for the memory region comprises invalidating a DMA validation entry in the Infiniband HCA corresponding to the memory region.

11. The method of claim 1, wherein a completion is not written for the execution of the first invalidation command until the second invalidation command is successfully processed by the Infiniband HCA.

12. A system, comprising:
    a host in an Infiniband network executing a software application, wherein the software application is configured to issue a first invalidation command and a second invalidation command to deallocate a memory region in the host, wherein the first invalidation command is for invalidating at least one key for access to the memory region, and the second invalidation command is for invalidating a translation lookaside buffer (TLB) entry for the memory region; and an Infiniband host communication adapter (HCA) operatively connected to the host and configured to communicate via the Infiniband network to:

receive the first and second invalidation commands, wherein the first and second invalidation commands are transmitted and received via a queue pair (QP) associated with the Infiniband HCA;

invalidate the at least one key associated with the memory region by removing a corresponding DMA validation entry for the memory region from a key validation table stored in the DMA module of the Infiniband HCA, wherein the at least one key is an index into the key validation table;

determine whether all memory access requests to the memory region have been processed by the HCA;

stall processing of the second invalidation command, when outstanding memory access requests to the memory region are present; and process the outstanding memory access requests for the memory region before executing the second invalidation command invalidating the TLB entry for the memory region.

13. The system of claim 12, wherein the Infiniband HCA is further configured to:

receive a request to access the memory region, wherein the request to access the memory region comprises a key for access to the memory region;

increment a memory access counter when the request to access the memory region is processed by the Infiniband HCA; and attempt to validate the key, wherein when the key is validated by the Infiniband HCA, ensuring that a corresponding address translation for the memory region is completed before deallocating the memory region.

14. The system of claim 12, wherein ensuring that a corresponding address translation for the memory region is completed before deallocating the memory region comprises stalling processing of the second invalidation command until the request to access the memory region completes address translation using the TLB entry for the memory region.

15. The system of claim 12, wherein determining whether all memory access requests to the memory region have been processed comprises:

inspecting the memory access counter to determine whether the memory access counter has a value greater than zero.

16. The system of claim 12, wherein when the memory access counter has a value of zero, completing processing of the second invalidation command, resulting in deallocation of the memory region.

17. The system of claim 16, wherein a completion is written for successful execution of the first invalidation command only after execution of the second invalidation command takes place.

18. The system of claim 12, wherein the first and second invalidation commands are issued by the software and processed by the Infiniband HCA as two separate work requests.

19. The system of claim 12, wherein invaliding the at least one key for the memory region comprises invalidating a DMA validation entry corresponding to the memory region in the Infiniband HCA.

20. An Infiniband host channel adapter (HCA) configured to communicate via the Infiniband network, comprising:

a direct memory access (DMA) validation module as part of the Infiniband HCA for storing a DMA validation table and a plurality of memory access keys, each of which is a credential to authenticate a memory access request, wherein the DMA validation module is configured to:

authenticate the memory access request using a corresponding key; and process a command to invalidate a memory access key by invalidating a corresponding DMA validation entry in the DMA validation table wherein the memory access key is an index into the DMA validation table; and a memory management module (MMU) for storing a translation lookaside buffer (TLB) comprising a plurality of memory address translations for a plurality of memory regions, wherein the Infiniband HCA is configured to:

receive and process a request to deallocate a memory region of the plurality of memory regions, wherein the request to deallocate the memory region comprises a first invalidation command for invalidating at least one key associated with the memory region and a second invalidation command for invalidating a translation lookaside buffer (TLB) entry for the memory region;

invalidate at least one key associated with the memory region;

determine whether all memory access requests to the memory region have completed address translation in the MMU;

stall processing of the second invalidation command, when outstanding memory access requests to the memory region are present; and process the outstanding memory access requests for the memory region before executing the second invalidation command.

\* \* \* \* \*